United States Patent Office 3,495,722
Patented Feb. 17, 1970

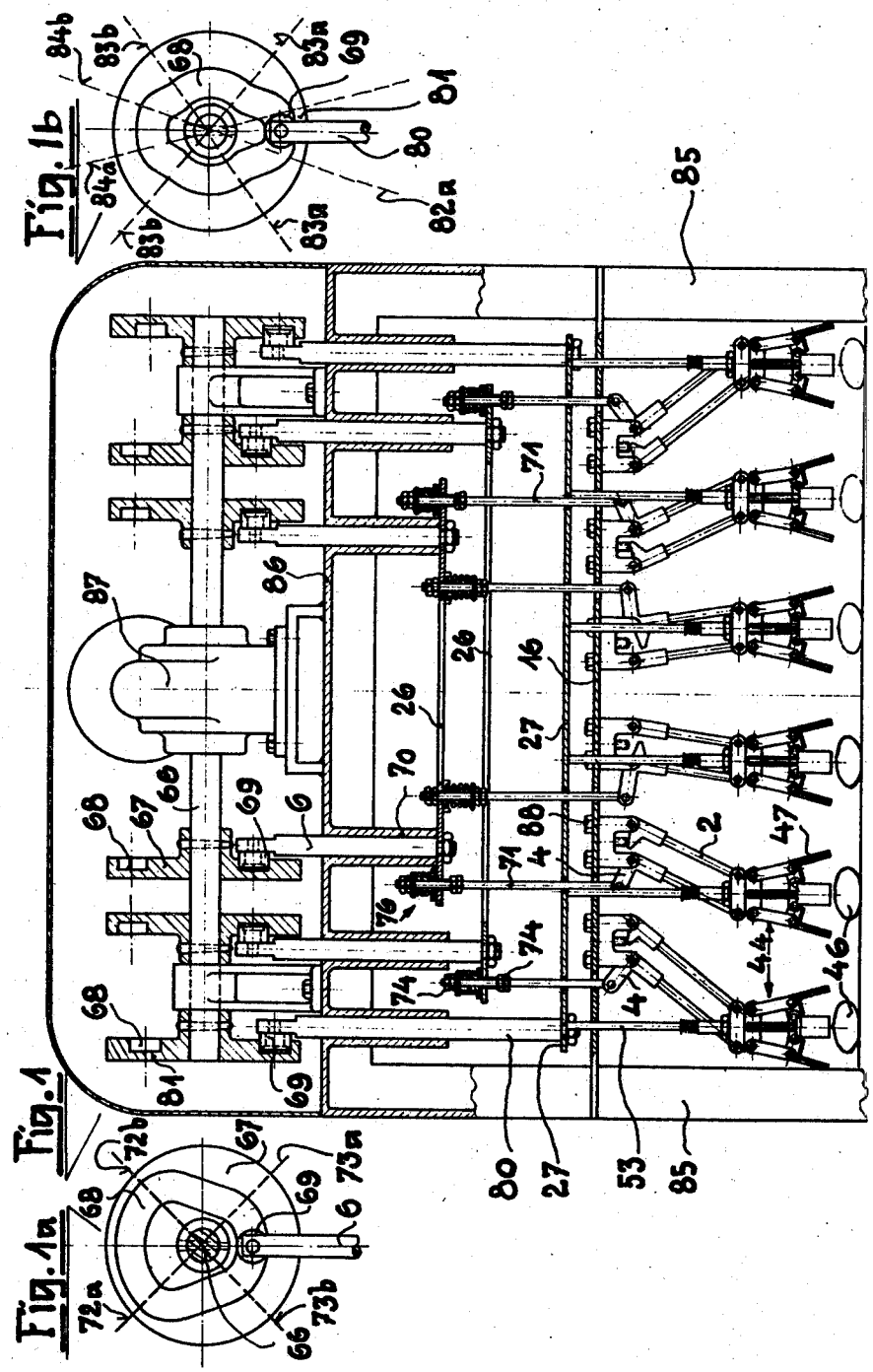

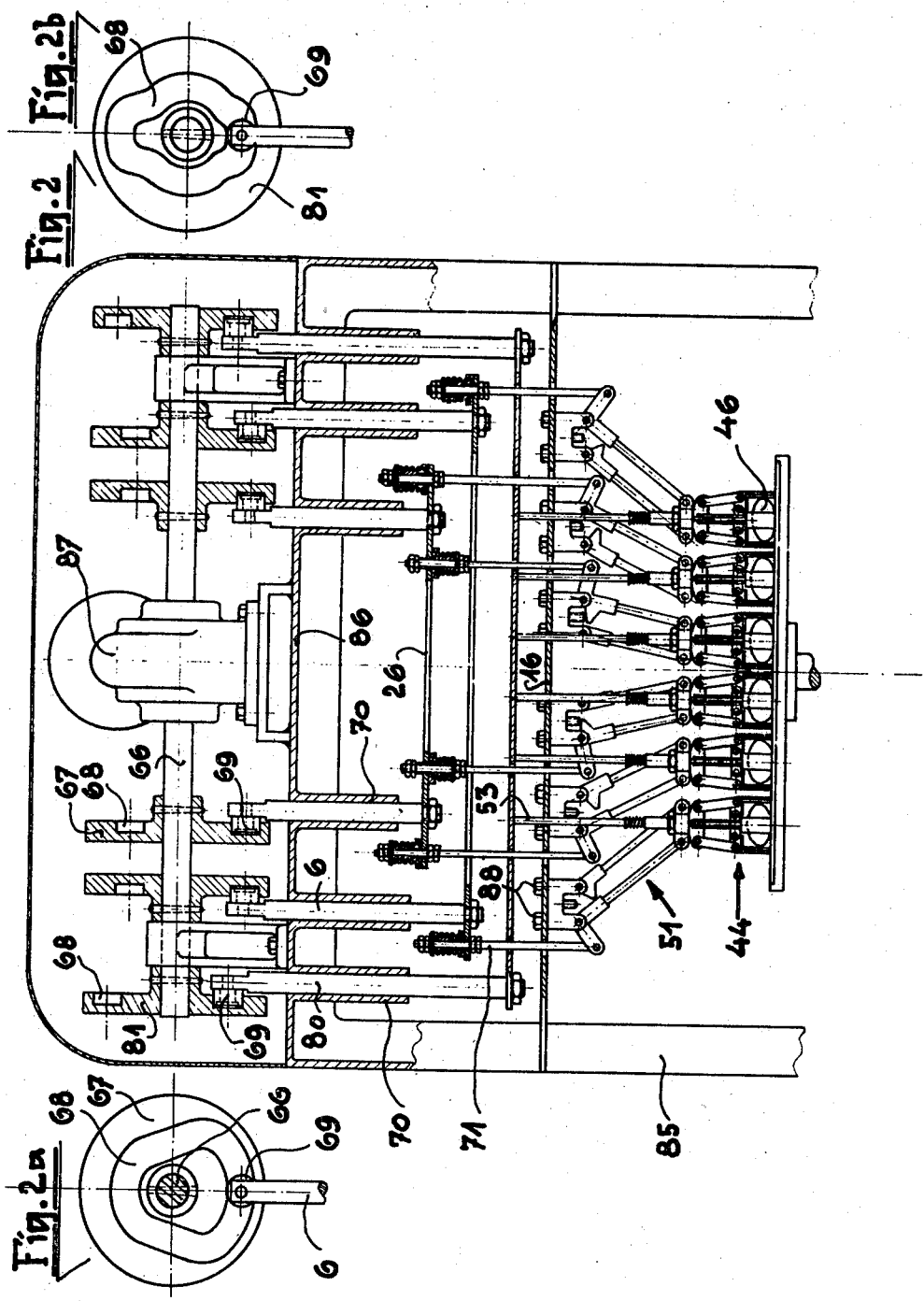

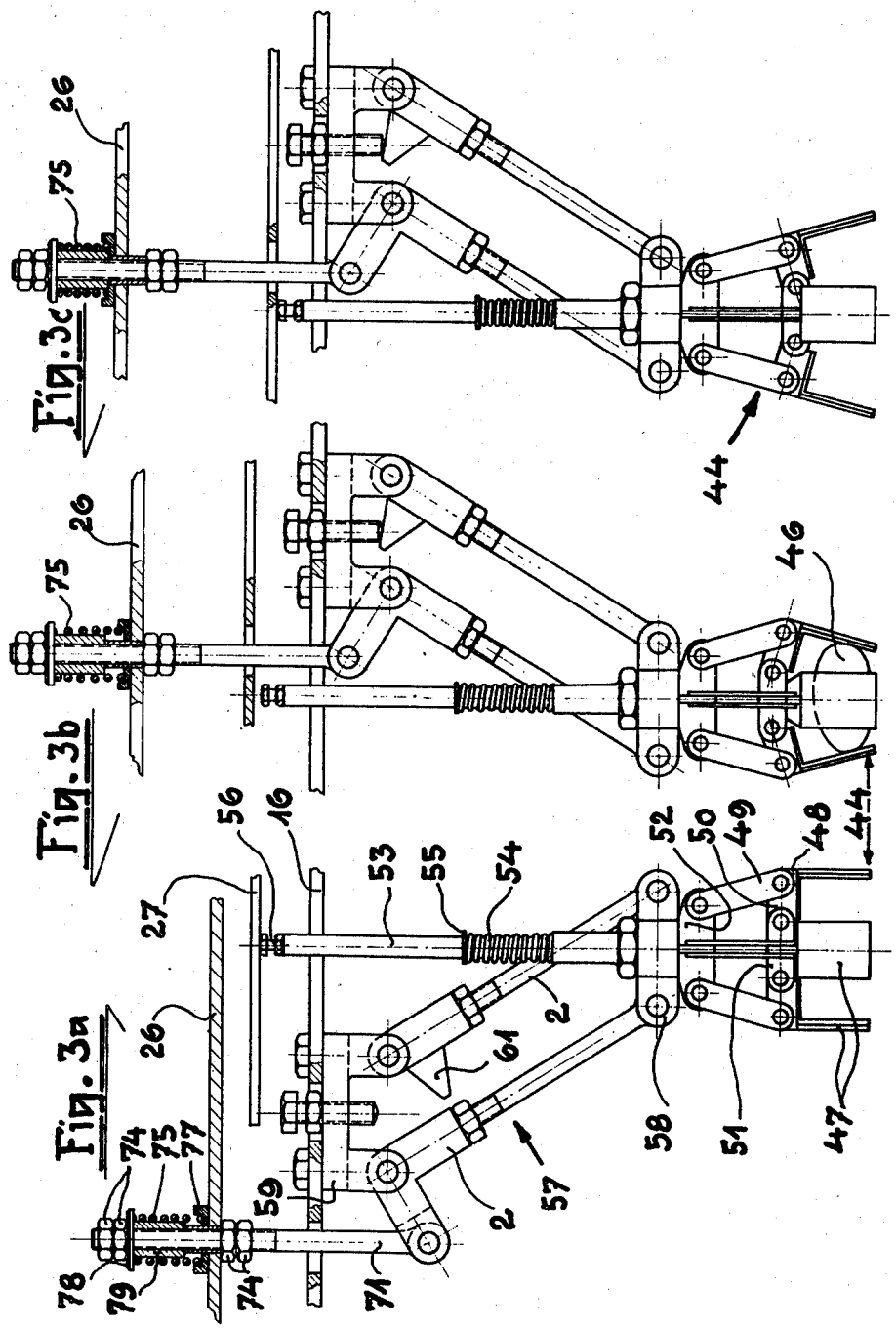

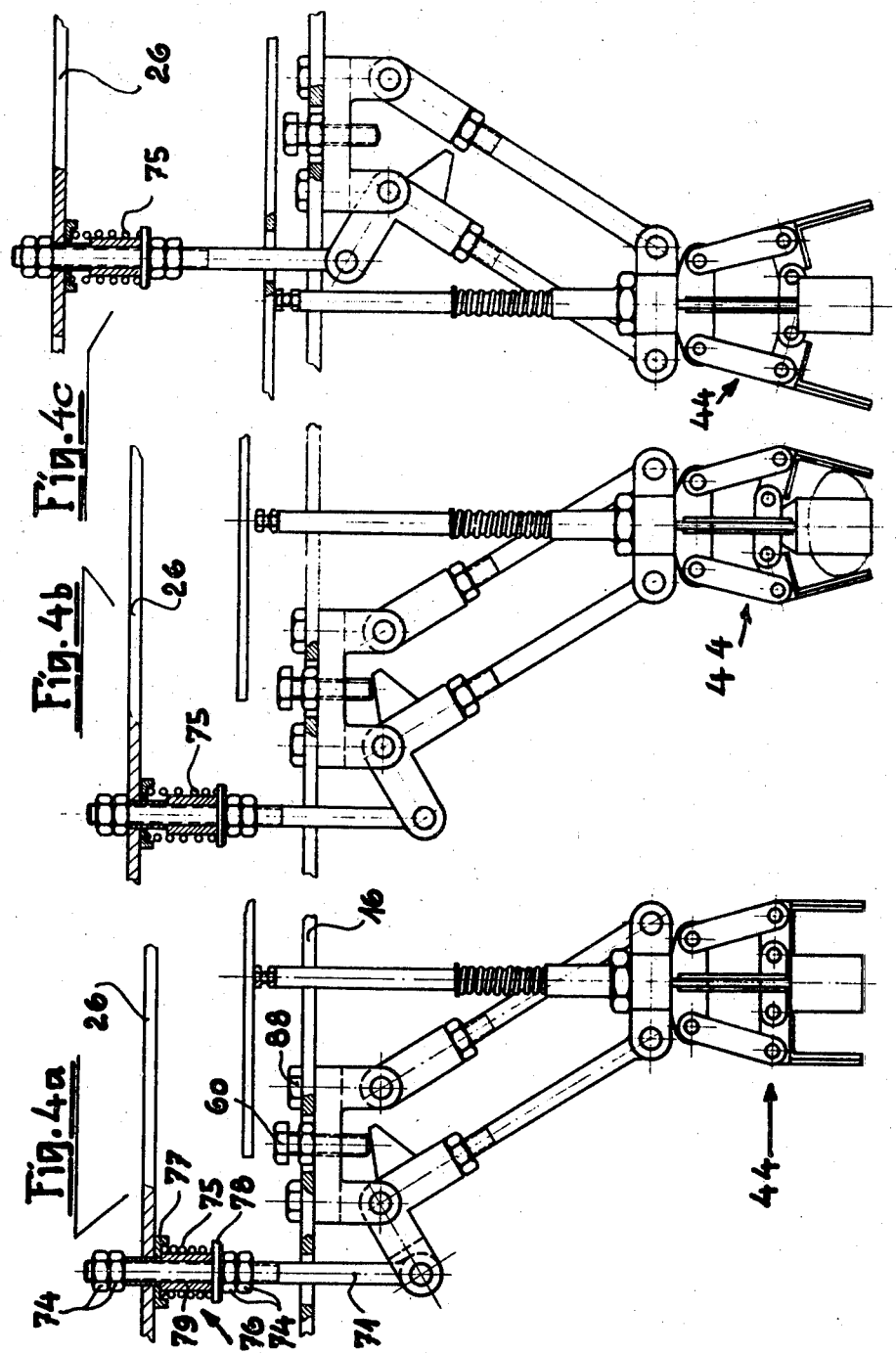

3,495,722
APPARATUS FOR GRIPPING AND DEPOSITING IN GROUPS PLAITED PIECES OF DOUGH BY MEANS OF GRIPPING ELEMENTS ARRANGED ABOUT A CENTER POINT
Herbert Schroder, Angerstrasse, Staffelstein, Upper Franconia, Germany
Continuation of application Ser. No. 656,592, July 27, 1967. This application Apr. 21, 1969, Ser. No. 818,191
Claims priority, application Germany, Aug. 8, 1966, Sch 39,371
Int. Cl. B25j 3/00; B66c 1/44
U.S. Cl. 214—1                                    6 Claims

ABSTRACT OF THE DISCLOSURE

An apparatus for gripping and depositing plaited pieces of dough by means of gripping devices arranged around a center point, comprising guide means connected to each gripping device, wherein the gripping device is adapted to be moved through a given distance in the direction towards and from the center point, and wherein the gripping device is equipped with at least two claws arranged to be moved in opposition.

---

This application is a continuation of Ser. No. 656,592, filed July 27, 1967, now abandoned.

The present invention comprises a device for gripping and depositing in groups plaited pieces of dough, with gripping devices arranged about a center, wherein each of the gripping devices is connected to guide means and is adapted to be moved through a given travel by means of controls towards and from the center. It relates more particularly to a transfer device for kneaded dough, for gripping and depositing in groups the said pieces, and having a gripping mechanism with at least two mutually spaced claws adapted to be moved in opposition relative to each other.

If in this device the paths of two gripping devices, or of the pieces of dough located therein, make contact, the mechanism is such that one gripping device has already passed the point of contact when the other reaches the same. To this end, the proposed device is equipped with several or only one reciprocating control rod, which, co-operating with control stops, move the gripping devices in temporally delayed rhythm successively against the action of springs in one direction and release them to the action of the springs again with time delay in the other direction.

The provision of springs in the zone of the gripping devices must be regarded as a drawback owing to the space requirements.

It has also been shown that the control rods, cooperating with the control stops, do not permit the subsequent change of the path of movement or of the motional sequence of the gripping devices. Moreover, with a device provided with gripping devices, the force of the springs must correspond at least to that force which is necessary for moving the claws of the grippers, and this presents a further drawback.

The invention has the object of eliminating these drawbacks. It is based on the novel principle that the springs can be omitted, if the parts of the control mechanism are arranged in a form-locking manner. The invention has therefore the object of achieving mutually delayed movements of the individual gripping devices, while the parts are form-lockingly arranged.

This object is realized by the invention mainly in that a disc, having a guide cam into which projects a pin located at one end of a rod and which is mounted on a shaft, has centric sections with different radii relative to the axis of the shaft, as well as eccentric sections. When the disc rotates, the rod will be at rest if its pin is in a centric portion of the guide, while if it engages into an eccentric portion, the rod will move in the direction of its axis. According to the length of the arcs of the eccentric section, the rod will be at rest for a longer or shorter period of time. According to the radius of the centric section, the position of the rod will differ from one position to the other.

The invention is not only suitable for moving a gripping mechanism, by connecting the rod as control rod in a form-locking manner with the gripping device and its pin projects into the disc forming the control disc, but may also be used for operating the claws of a gripping mechanism. To this end, the rod, acting as claw actuating rod, is connected with the claw actuating plate of the already proposed transfer device for kneaded dough and projects with its pin into a disc constituting a claw actuating disc. Preferably, the control disc and the claw actuating disc are mounted on one shaft so that the movements of the grippers and the actuation of the claws can be derived from the rotation of a single shaft.

The gripping devices of such a mechanism comprise such, in which the movements differ strongly between one and the other, and such, in which they differ only little. In order to move with one control disc several gripping devices, the movements of which differ only little, the invention provides that two mutually spaced limit stops or a follower movable between these against the force of a spring, is or are connected in a form-locking manner with one gripping device or with the reciprocating control rod, respectively. If one gripping device has finished its movement, the limit stops connected therewith are at rest. The associated follower, however, continues to move against the force of the spring with the control rod, which operates in turn another gripping device.

The invention will be further described, by way of example, with reference to the accompanying drawings, showing an embodiment of the invention, and in which:

FIG. 1 is a cross-section of a device with gripping devices in the baking position;

FIG. 1a shows a control rod in the position corresponding to the baking position;

FIG. 1b shows a claw actuating disc in a position corresponding to the baking position;

FIG. 2 shows the same arrangement as FIG. 1 with the grippers in the receiving position;

FIG. 2a shows the control disc in the position corresponding to the receiving position;

FIG. 2b shows the claw actuating disc in the position corresponding to the receiving position;

FIGS. 3a and 4a show, respectively, each a gripper device in the operational position with the claws in the receiving position;

FIGS. 3b and 4b show, respectively, each the gripper device in the baking position and in the kneading position with the claws closed; and FIGS. 3c and 4c show, respectively, the gripper device in the baking position with the claw spread.

Each gripping device 44 has, as shown, e.g., in FIG. 3a four oblong rectangular claws, curved after the manner of sections of a cylinder; of which always two claws 47 are arranged opposite each other and adapted to be moved in opposition. Each claw 47 forms the claw leg of a cranked lever mounted rotatably at its angle 48 on the end of a stay 49. The other legs, extending perpendicularly to the claw legs, the operating legs 50 of the crank lever of a gripping device point towards each other and are articulately mounted on the arms of a star-shaped member 51. The other end of a stay 49 of the gripper device is mounted on a tube section 52. A claw rod 53 mounted on the star member projects through the tube and is displaceable therein. A claw closing spring 54 in the form of a compression spring is fitted over the claw rod 53 and rests through an adjustable abutment ring 55 on the same and on the tube section 52. The length of each claw rod is accurately adjustable by means of an adjusting screw 56 located at its free end. All gripping devices 44 are mounted by means of individual guide mechanisms 57 on a support plate 16. Each guide mechanism has a lower parallelogram-shaped transverse stay 58, fitted by means of a bore over the claw rod 53, the abutment ring 55 and the claw closing spring 54 on to the tube section 52. By means of a nut screwed on to the tube section, the gripper device is retained on the lower parallelogram-shaped stay and hence on the guide mechanism. At both ends of the lower transverse parallelogram stay 58, a parallelogram lever 2 is articulated, consisting of two parts screwed together and thus adjustable in length. The free ends of these parallelogram-shaped levers 2 are articulately connected with an upper parallelogram-shaped stay 59, screwed to the underside of the frame plate 16. The effective position of the gripper device is adjusted by means of a setting screw 60, screwed through the upper parallelogram stay 59, being adjustable, and abutting on a limit stop 61 mounted on the parallelogram lever 2.

As shown in FIGURE 1, each gripper device is associated with a control mechanism whose components interengage in a form-locking manner. The starting point of each control mechanism is a control disc 67 mounted on a drive shaft 66 and having a control guide cam 68. Into this guide cam projects a pin 69 on the one end of a control rod 6. The control rod 6 is guided in stationary bushings 70 and can move only up and down. The lower ends of two identical control rods coupled to identical control discs, and projecting below from the bushes, are mounted on a control plate 26. Two control plates 26 are arranged one above the other. Several downwardly projecting control rods 71 are mounted on each control plate as described further below. Each connecting rod 71 is associated with one gripper device 44 and is articulated with its lower end to the free end of a control abutment or stop 4, mounted rigidly on one of two parallelogram levers 2 carrying the gripper device 44. If a control plate is moved up or down by means of the control rods 6, the connecting rods 7, mounted to this plate move up or down. Each connecting rod pivots thereby the parallelogram lever 2 articulated thereto and with it also the gripper device.

To achieve that a gripper device 44 has, with continuously rotating control disc, for a certain period the baking position of FIG. 1 and for a certain period of time the effective position shown in FIGURE 2, and guide track or cam 68 of the control disc 67 has, as shown in FIG. 1a, two centric sections with different radii. The section defined by the dotted straight lines 72a, 72b has a larger radius than that defined by the dotted straight lines 73a, 73b. If the pin 69 of a control rod extends in the section with the smaller radius, as in FIG. 1a, the control rod is pulled upwardly, and the gripper device is in the baking position. If the pin extends into the section with the larger radius, as in FIG. 2a, the control rod is pushed down and the gripper device 44 is in the kneading position. The period of time during which the gripper device 44 remains in one or the other position is determined by the size of the circular arc of the centric section. The start or the end of the movement of a control plate 26 occurs when the pin 69 on the associated control rods 6 passes from one centric section into an eccentric section. The start of the movement of one control plate is delayed against the start of the movement of another by the configuration of the guide track in the associated control discs and by the arrangement of the control discs on the common shaft.

By virtue of a delaying connection 76 of the connecting rods 71 of several gripper devices 44 with a common control plate 26, the start of the movement or the end of the movement of these gripper devices is also delayed with regard to each other. To this end, each connecting rod 71 is, as shown, e.g., in FIG. 4a, pushed through the control plate 26 and carries on both sides of the control plate pairs of locknuts 74 acting as limit stops. Between one pair of locknuts 74 and the control plate 26, there is a compression spring 75, fitted over the connecting rod. One end of this compression spring rests through a retaining ring 77 on the control plate and the other through a washer 78 on one pair of locknuts 74. On these locknuts 74 rests a support tube 79 which is pushed underneath the compression spring 75 over the connecting rod 71 and ends in spaced relationship from the second pair of locknuts.

When the compression spring 75 is not compressed, the control plate 26 rests on one pair of locknuts 74. When it is moved up or down, it carries the connecting rod 71 along and the gripper device is pivoted to and fro. When the pivoting movement of the gripper device 44 is terminated, for example, because the stop 61 abuts against the adjusting screw 60 in the frame plate 16, and the control plate is moved further to and fro, the compression spring 75 is compressed until the control plate 26 rests on the support tube 79. During the travel of the compression spring, the control plate pivots a further gripper device which comes to rest only at the end of the travel of the compression spring and therefore later than the first one. In FIGURES 3a, 3b and 3c, the compression spring 75 is arranged above the control plate 26 and comes to rest during the upwardly directed movement of the control plate in front of the control plate, while in FIGURES 4a, 4b and 4c, the compression spring 75 is located underneath the control plate, and the gripper device starts to move during the upward movement of the control plate after the same.

The movement of the claw actuation plate 27 and hence a claw actuating rod 53 is effected, as shown in FIG. 1, by means of two claw actuating rods 80, rigidly connected with the claw actuating plate 27, and passing upwardly through bushings 70, and carrying pins 69 on their upper projecting ends. The pin 69 projects into the guide track 68 of a claw actuating disc 81 mounted on the shaft 66. The guide track 68 of the claw actuating disc 81 has, as shown in FIG. 1b, a section with large radius, defined by the dotted line straights 82a, 82b, corresponding to the spreading position of the claws, to the right and to the left therefrom a section defined by dotted straight lines 83a, 83b with smaller radius, corresponding to the closed position of the claws, and opposite the spreading position section, a section defined by the straight line 84a, 84b with a medium radius, corresponding to the receiving position of the claws.

The device is completed by laterally arranged frame supports 85 on which is mounted the shaft via the frame plate 16, a base 86 between the frame supports, carrying the bushings 70, and a motor 87, which drives the shaft 66. Owing to the arrangement according to the invention, all parts are easily accessible and the movements and path of each gripper device may be adjusted and readjusted easily. The fixing screws 88, by which the gripper devices 44 are mounted on the carrier plate 16 and the setting screws 60 in the carrier plate are accessible from the top through openings in the claw plate 27 and the two control plates 26. The distance of both pairs of locknuts 74 on one of connecting rods 71 is adjustable within a wide range.

I claim:
1. In an apparatus for gripping, moving and depositing in groups articles of dough, the combination of a frame, a plurality of lever means pivotally connected to said frame, a plurality of gripper means pivotally connected to said lever means respectively for gripping said articles of dough, a plurality of first rod means pivotally connected to said lever means respectively for moving said respective lever means, first plate means for actuating said plurality of first rod means and comprising a plurality of plates each for actuating selected rods of said plurality of first rod means, first transmission means for moving said plurality of first rod means and comprising a plurality of devices each for moving one of said plates and drive means for driving said first transmission means whereby when said first transmission means is driven, said devices operate in a predetermined sequence so that selected gripper means also move in a predetermined sequence.

2. The combination as claimed in claim 1, in which each said device for moving one of said plates of said first plate means comprises a shaft, a rotatable disc provided on the shaft, guide tracks mounted on the rotatable disc and having sections with different radii centrally to said shaft and sections eccentrically to said shaft, and the starting of finishing points of the centric sections of the guide tracks of one of said devices being offset relative to the starting of finishing points of the centric sections of the guide tracks of the other of said devices, so that the start or the end of the movement of one of said plates is delayed against the start or the end of the movement of the other of said plates.

3. The combination as claimed in claim 1 in which each said gripper means comprises a plurality of claw members adapted to be moved in opposition one to another by a corresponding second rod means and including a plurality of second rod means for actuating said gripper means respectively, second plate means for actuating said plurality of second rod means, second transmission means for actuating said second plate means and drive means for driving said second transmission means.

4. The combination as claimed in claim 3 in which the second transmission means comprises rods each connected with the said second plate means and coacting with a guide track, a shaft, a rotatable disc provided on the shaft, and said guide tracks each being mounted on said rotatable disc and having sections with different radii centrally to said shaft and sections eccentrically to said shaft.

5. In an apparatus for gripping, moving and depositing in groups articles of dough, the combination of a frame, a plurality of lever means pivotally connected to said frame, a plurality of gripper means pivotally connected to said lever means respectively for gripping said articles of dough, a plurality of first rod means pivotally connected to said lever means respectively for moving said respective lever means, first plate means for actuating said plurality of first rod means and comprising a plurality of plates each for actuating selected rods of said plurality of first rod means, said rods being capable of movement relative to said plates respectively, each of said rods having stop means on either side of a corresponding plate and having resilient means between said stop means, first transmission means for moving said plurality of first rod means and comprising a plurality of devices each for moving one of said plates and drive means for driving said first transmission means whereby when said first transmission means is driven, said devices operate in a predetermined sequence so that selected gripper means also move in a predetermined sequence.

6. The combination as claimed in claim 5 wherein said stop means are adjustable axially of each of said rods.

References Cited

UNITED STATES PATENTS 3,212,808  10/1965  Breslav _____ 294—87 X
3,302,967   2/1967  Harris _____ 294—87 X GERALD M. FORLENZA, Primary Examiner G. F. ABRAHAM, Assistant Examiner U.S. Cl. X.R.

294—87